United States Patent [19]

Sakai

[11] 3,850,685

[45] Nov. 26, 1974

[54] THIN LAYER SEMICONDUCTOR DEVICE

[75] Inventor: Yoshio Sakai, Tokyo, Japan

[73] Assignee: Pioneer Electronic Corporation, Tokyo, Japan

[22] Filed: Oct. 26, 1972

[21] Appl. No.: 300,949

[30] Foreign Application Priority Data

Oct. 26, 1971 Japan ............................... 46-84808

[52] U.S. Cl. ........... 117/201, 75/134 T, 117/106 A, 148/174, 317/235 AP

[51] Int. Cl. ............................................. H01l 7/36

[58] Field of Search ........ 117/201, 106 A; 148/174; 75/134 T; 317/235 AP

[56] References Cited

UNITED STATES PATENTS

| | | | |
|---|---|---|---|
| 3,441,453 | 4/1969 | Conrad et al. | 117/201 X |
| 3,558,373 | 1/1971 | Moody et al. | 117/201 X |
| 3,666,553 | 5/1972 | Arthur et al. | 117/201 X |
| 3,674,549 | 7/1972 | Ohshita et al. | 117/201 |

*Primary Examiner*—Mayer Weinblatt
*Attorney, Agent, or Firm*—Sughrue, Rothwell, Mion, Zinn & Macpeak

[57] ABSTRACT

A thin layer semiconductor device comprising a mixed crystal, $InSb_{(1-x)}As_x$ composed of indium, In, antimony, Sb, and arsenic, As, in a compounding ratio in which $x$ satisfies the following relationship.

3 Claims, 1 Drawing Figure

PATENTED NOV 26 1974 3,850,685
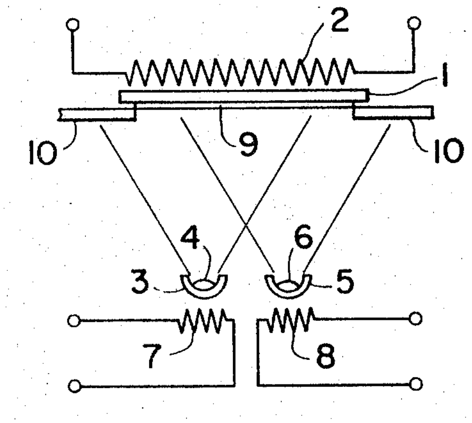

THIN LAYER SEMICONDUCTOR DEVICE

BACKGROUND OF THE INVENTION

1. Field of the Invention

This invention relates to thin layer semiconductor devices formed by vapor deposition, and more particularly to those which are superior in the magneto-electric conversion nature.

2. Description of the Prior Art

It is widely known that indium antimonide, InSb, has a superior nature in its magneto-electric conversion and that this substance can be formed into a thin layer by vapor deposition, which is to be employed as a Hall element.

In the case where the indium antimonide, InSb, is formed into a vapor-deposited layer, the so-called "three temperature method" is used for controlling the temperatures at three points, consisting of a substrate on which the indium antimonide is to be deposited, a boat in which indium, In, is placed, and another boat in which antimony, Sb, is placed, separately, because the vapor pressures of indium, In, and antimony, Sb, are widely different. However, because of the difficulty in controlling the temperatures at these points, a thin layer of good quality could not be obtained in a reproducible manner.

To improve the above-described difficulties, the applicants of this invention developed a method, U.S. Pat. No. 3,674,549, which can be described as a "two point method", wherein indium antimonide, InSb, and antimony, Sb, are placed in one boat, and the temperatures of this boat and the substrate are controlled as desired. This method has been found advantageous.

However, this method has a drawback in that the temperatures of the two points must be controlled accurately even though the number of the points is only two, because the vapor deposited thin layer formed on the substrate in accordance with the "two point method" is initially melted and grown after it has been deposited thereon, and in this case, if the temperature of the substrate is too high, the thin layer thus deposited will be vaporized again, and if the temperature thereof is too low, the growing of the thin layer will not be obtained. Furthermore, the thin layer thus obtained is not sufficiently uniform, whereby unbalance results in the output Hall voltages, or thin layers having uniform characteristics could not be obtained.

SUMMARY OF THE INVENTION

This invention is directed toward overcoming the above described drawbacks of the conventional thin layer semiconductor devices. A first object of the invention is to provide a thin layer semiconductor device, generally having a thickness ranging from about 0.8 $\mu$ to 1.5 $\mu$, the thickness of which is far more uniform than that of conventional thin layer devices and the characteristics thereof are more stable with respect to variations in temperature.

A second object of the present invention is to provide a thin layer semiconductor device which can be produced with a good reproducibility.

The above objects are achieved by the process of this invention which comprises in a vacuum forming a thin layer of indium-antimony-arsenic, $InSb_{(1-x)}As_x$ on a heated substrate by evaporating indium antimonide, InSb, and arsenic, As, separately, whereby a thin layer semiconductor device of $InSb_{(1-x)}As_x$ wherein $x$ satisfies the relationship $$0<x<0.3$$

is obtained.

BRIEF DESCRIPTION OF THE ACCOMPANYING DRAWING

The drawing is a schematic diagram showing an example of the production method to explain the thin layer semiconductor device according to the present invention, in which 1 is a substrate to be vapor-deposited, 2 is a heater, 3 is a first boat, 4 is indium antimonide, 5 is a second boat, 6 is arsenic As, 7 is a heater, 8 is a heater, 9 is a thin layer consisting of indium-antimony-arsenic, $InSb_{(1-x)}As_x$, and 10 is a mask.

DETAILED DESCRIPTION OF THE INVENTION

The invention will now be described with reference to the accompanying drawing showing an embodiment of the invention. In this drawing, numeral 1 designates a substrate on which the thin layer is to be vapor-deposited, numeral 2 designates a heater for heating the substrate 1, and numeral 3 designates a first boat made of molybdenum for holding the indium antimonide, InSb, designated by numeral 4. Numeral 5 designates a second boat also made of molybdenum for holding arsenic, As, designated by 6. Numerals 7, 8 designate heaters for heating the first and second boats, respectively. With the above described arrangement, the heaters 2, 7 and 8 are controlled in a vacuum-depositing vessel whereby indium antimonide 4, InSb, is evaporated from the boat 3 and arsenic 6, As, is evaporated from the boat 5, for example, of molybdenum or tungsten, so that a thin layer 9 consisting of indium-antimony-arsenic, $InSb_{(1-x)}As_x$, is formed on the substrate 1. Numeral 10 designates a mask.

Suitable substrates which can be employed as substrate 1 are mica and ferrite substrates, where a ferrite substrate is used it is previously sputtered with $Al_2O_3$. Mica is preferred as the substrate. Resistance wire type heaters generally of tungsten are well known and can be suitably used as the heaters 2, 7 and 8. A suitable heating temperature for the substrate ranges from about 400°C to about 500°C and that of the boat 5 is about 1,000°C in a vacuum ranging from about $2\times10^{-5}$ torr to about $5\times10^{-5}$ torr with about $2\times10^{-5}$ being most preferred. Both the indium antimonide and the arsenic are of extremely high purity, e.g., 99.9999 percent.

Although two boats 3 and 5 are employed in the above described embodiment of the invention, the number of the boats, that is, the number of the places in which the temperatures must be controlled, is not important in the invention. The important feature of the present invention is in the fact that arsenic, As, is added to the conventional composition of indium antimonide, InSb.

Using the conventional composition, the indium antimonide layer once formed tends to be partly vaporized again, thus making it difficult to form a uniform thin layer on the substrate. With the addition of arsenic, As, this re-evaporation of the indium antimonide layer can be prevented, and a thin layer of uniform composition can be obtained.

Furthermore, in accordance with the conventional process, the separation of indium, In, in the form of collective depositions in various parts of the thin layer has been observed frequently, and this resulted in the thin layer being indium rich. However, with the addition of arsenic, As, the indium, In, separated becomes mixed crystals of indium-antimony-arsenic, $InSb_{(1-x)}As_x$, whereby a stoichiometrically good quality thin layer having very little separated indium, In, is obtained.

According to the present invention as described above, various advantages as described below can be obtained. Firstly, a thin layer uniform over the entire area can be obtained without requiring any precise control of the temperature. Secondly, even where an extremely large number of thin layers is manufactured, the differences in the characteristics are very small, whereby a number of thin layers of substantially equal characteristics can be obtained. Thirdly, the thin layers have little variation in their characteristics, for instance, in the specific resistance, with respect to temperature variations, thus stable characteristics can be obtained. Fourthly, a thin layer which is extremely uniform throughout the entire area can be obtained, whereby the thin layer is employed as a Hall element, the unbalance in the output Hall voltage is extremely small, and a superior magneto-electric conversion characteristic having an electron-mobility at room temperature of more than 40,000 $cm^2/V$. sec. can be realized.

While the invention has been described in detail and with reference to specific embodiments thereof, it will be apparent that various changes and modifications can be made therein without departing from the spirit and scope thereof.

What is claimed is:

1. A process for preparing a thin layer semiconductor device consisting of a mixed crystal of $InSb_{(1-x)}As_x$ in which $x$ satisfies the following relationship $$0<x<0.3$$

which comprises in a vacuum forming a thin layer of said mixed crystal of indium-antimony-arsenic on a heated substrate by evaporating indium antimonide by heating said indium antimonide and simultaneously evaporating arsenic by heating said arsenic, whereby said vaporized indium antimonide and said vaporized arsenic are deposited on said substrate as mixed crystals of said indium-antimony-arsenic.

2. The process of claim 1, wherein said vacuum ranges from about $2 \times 10^{-5}$ torr to about $5 \times 10^{-5}$ torr.

3. The process of claim 1, wherein said substrate is heated to a temperature ranging from about 400°C to about 500°C.

* * * * *